Figure 1:
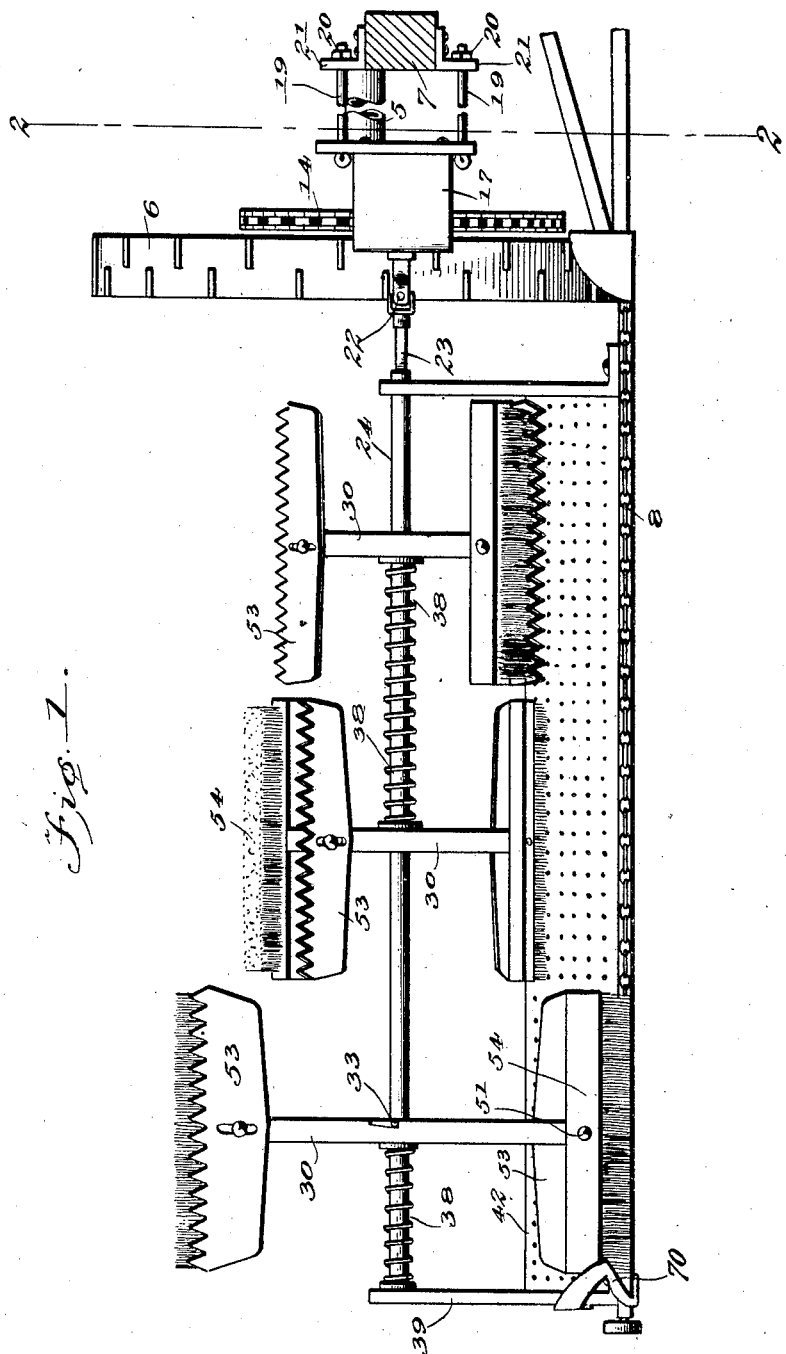

April 14, 1925.

R. C. BECTON

MOWER ATTACHMENT

Filed April 29, 1922

1,533,721

3 Sheets-Sheet 1

WITNESSES

INVENTOR
R.C. Becton
BY
ATTORNEYS

April 14, 1925.  
R. C. BECTON  
MOWER ATTACHMENT  
Filed April 29, 1922  
1,533,721  
3 Sheets-Sheet 2
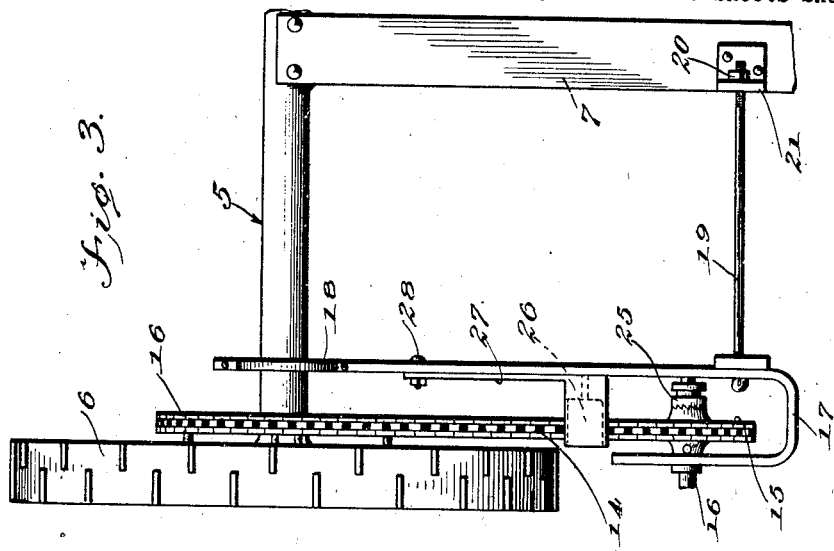
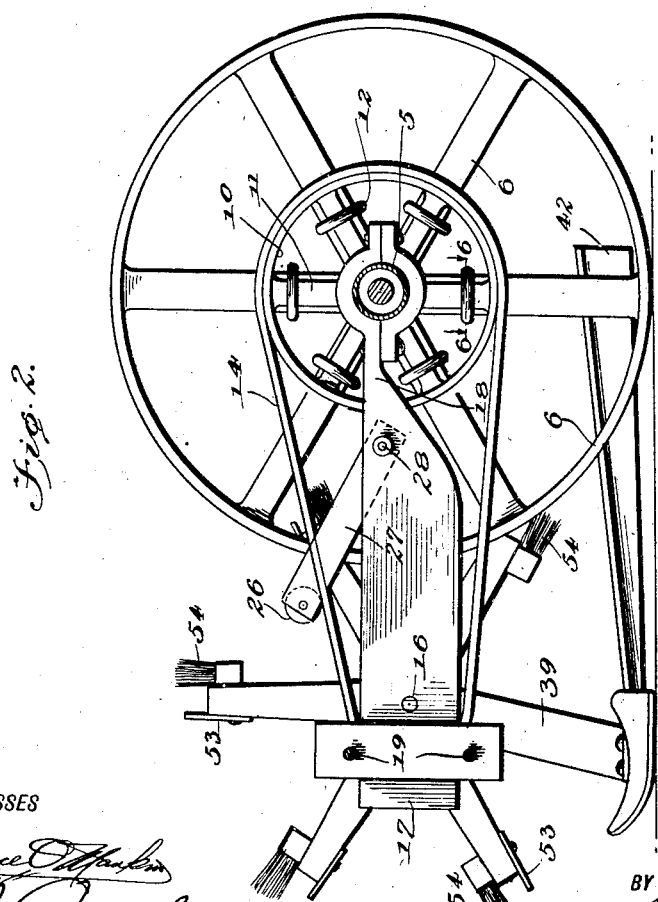
WITNESSES
INVENTOR
R. C. Becton
BY
ATTORNEYS April 14, 1925.
R. C. BECTON
1,533,721
MOWER ATTACHMENT
Filed April 29, 1922 3 Sheets-Sheet 3
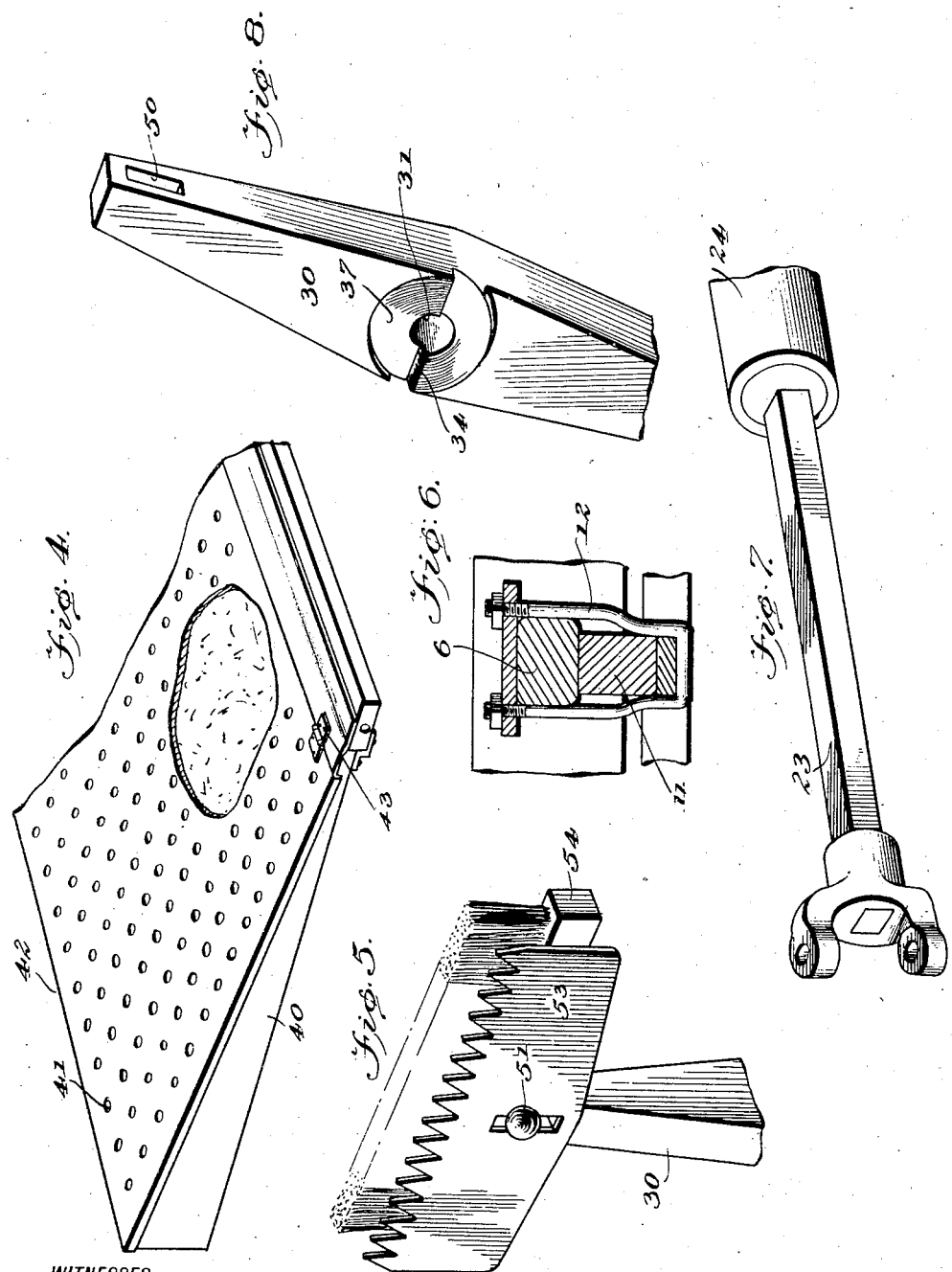
WITNESSES
INVENTOR
R.C.Becton,
BY
ATTORNEYS Patented Apr. 14, 1925.

1,533,721

UNITED STATES PATENT OFFICE.

ROY CLARENCE BECTON, OF DYER, TENNESSEE.

MOWER ATTACHMENT.

Application filed April 29, 1922. Serial No. 557,437.

*To all whom it may concern:*

Be it known that I, ROY C. BECTON, a citizen of the United States, and a resident of Dyer, in the county of Gibson and State of Tennessee, have invented certain new and useful Improvements in Mower Attachments, of which the following is a specification.

This invention relates to mowers and more particularly to a seed collecting means therefor.

Briefly stated, an important object of this invention is to provide a mower attachment which may be arranged rearwardly of and above the finger bar of the mower so as to effectively remove and collect the seeds from the material cut by the mower, thereby overcoming the necessity of picking up the seeds in a separate operation for subsequent planting.

Further, the invention aims to provide a mower attachment having simple means whereby the brushes and rakes may be conveniently adjusted with relation to the seed receiving means and the finger bar, as the occasion requires.

Also, an important object is to provide a mower attachment wherein the material engaging element may be moved away from the pan so as to allow the top of the pan or collecting member to be elevated for removing the seeds.

A further object is to provide a mower attachment of the class described which is of highly simplified construction, durable in use and cheap to manufacture.

Other objects and advantages of the invention will be apparent during the course of the following description.

In the accompanying drawings forming a part of this application and in which like numerals are employed to designate like parts throughout the same,—

Fig. 1 is an elevation of the improved attachment applied to a mower, parts being broken away, Fig. 2 is a vertical transverse sectional view taken on line 2—2 of Fig. 1, Fig. 3 is a fragmentary plan view of a power transmitting means forming a part of the attachment, Fig. 4 is a fragmentary perspective of a pan embodied in the invention, Fig. 5 is a fragmentary perspective view illustrating the means for holding the brush and the rake in a set position, Fig. 6 is a detail view illustrating the means for securing the sprocket wheel to one of the main wheels of the mower, the view being taken on line 6—6 of Fig. 2, Fig. 7 is a fragmentary perspective of a power transmitting shaft embodied in the invention, and Fig. 8 is a fragmentary perspective of a reel embodied in the invention.

In the drawings, wherein for the purpose of illustration is shown a preferred embodiment of the invention, the numeral 5 generally designates a mower of any standard type and the said mower, as illustrated in Fig. 3, is provided with attaching wheels 6 and a beam or tongue 7 to which the draft animals are hitched.

The mower is also provided with the usual cutter bar 8 extended laterally therefrom and as is well known, the bar 8 operates to mow the materials in the path of travel of the mower.

The invention forming the subject matter of this application includes a sprocket wheel 10 having a plurality of spokes 11 bolted to the spokes of the traction wheel 6 by means of U-bolts 12 or other similar fastening devices. The central portion of the sprocket wheel 11 is preferably cut away so as not to interfere in any way with the rear axle of the mower.

As illustrated in Fig. 2, a sprocket chain 14 is trained about the sprocket wheel 10 and has its forward end connected to a second sprocket wheel 15 secured on a drive shaft 16. The drive shaft 16 is rotatably extended through a substantially U-shaped frame 17 which is preferably secured to the rear axle of the mower, as indicated at 18. The U-shaped frame or bracket 17 is also supported by means of a pair of stay bolts 19 having connection with the beam 7 by means of bolts 20 which engage brackets 21. It will be seen that the stay bolts 19 form a reliable means for supporting the frame or bracket 17 in a horizontal position.

The drive shaft 16 is formed with a universal joint 22 and with a squared section 23 which is slidably received within the hollow axle 24 of the reel. The axle 24 is, of course, formed with a square bore to slidably receive the squared section 23 whereby to establish a driving connection between the drive shaft 16 and the reel. Further, the sliding but non-rotatable connection between the drive shaft and the reel permits the reel to adjust itself to inequalities in the line of travel and the universal joints 22 also permit the reel to move about a horizontal axis. In carrying out the invention, the shaft 16 may be provided between branches of the U-shaped bracket 17 with an extension 25 which is controlled by any suitable mechanism for breaking the driving connection between the sprocket wheel 15 and the shaft 16 or for establishing a driving connection between the members 15 and 16.

A tensioning member 26 is arranged upon the sprocket chain 14 and is carried by an arm 27 pivoted to the long branch of the U-shaped member 17 as indicated at 28.

As illustrated in Figs. 1 and 2, the reel axle 24 is arranged above the finger bar 8 and is provided with a plurality of arms 30 having their intermediate portions formed with cylindrical openings 31 for the reception of the axle. The arms 30 are secured to the axle 24 by means of pins 33 which extend through the axle and are engaged by shoulders 34.

As illustrated in Fig. 8, one side of each arm 30 is provided with semi-circular recesses 37 which gradually increase in depth toward one end to define the oppositely located shoulders 34. The arms 30 and more particularly the shoulders 34 of the same, are pressed into engagement with the several pins 33 by means of springs 38 mounted on the axle 24 and confined between the arms. One of the springs is confined between the adjacent arm and one of the standards 39 which support the axle.

In applying the improved threshing device or apparatus, the standards 39 are secured to the finger bar and are inclined rearwardly to some extent so that the brushes and the several rakes will be located above the pan, designated by the numeral 40.

The pan 40 receives the seeds which pass through the perforations 41 in the top 42. Fig. 4 illustrates that the top 42 or cover is secured to the pan by means of hinges 43. It will be seen that the cover 42 may be readily elevated for removing the collected seeds.

When it is desired to elevate the cover 42, the arms are so positioned that they will not in any way interfere with the elevation of the cover. This is possible by reason of the yieldable connection between the axle 24 and the arms. When the arms are swung to the desired position, the same may be locked by any suitable means.

The ends of the arms 30 are formed with openings or slots 50 to receive attaching bolts 51 which are employed to secure rakes 53 and the brushes 54 in position. The rakes and the brushes 53 and 54 respectively, are also slotted so that the rakes and the brushes may be conveniently adjusted from time to time. That is to say, the rakes and the brushes may be adjusted with relation to the finger bar and the pan to compensate for wear and for operation under a variety of conditions. One end of the bar 8 is provided with a divide member 70.

In operation the mower advances to perform the cutting operation and the material which is cut is fed onto the rear or upper portion of the cover by the brushes 54. As the cover 42 is inclined downwardly toward the forward edge of the pan, the material will slide downwardly after each time it is moved upwardly by the brushes and will pass through openings 41 and into the pan. Of course, when the seeds are received in the pan they are confined there so that the same may be removed when convenient for subsequent planting.

The form of the invention herein shown and described is merely a preferred example of the same, and it is therefore understood that such modifications and changes may be made as will remain within the spirit of the invention and the scope of the claims.

Having thus described the invention, what I claim is:—

1. An attachment for mowers comprising a reel inclusive of an axle and a series of arms mounted loosely on the axle, driving members mounted on said axle, said arms being formed with shoulders adapted to be engaged by said driving members to establish a driving connection between said arms and said axle, and a spring urging said shoulders into engagement with said driving member, and brushing members carried by said arms.

2. An attachment for mowers comprising a reel inclusive of an axle and a series of arms mounted loosely on the axle, driving members mounted on said axle, said arms being formed with shoulders adapted to be engaged by said driving members to establish a driving connection between said arms and said axle, a spring urging said shoulders into engagement with said driving member, brushing members carried by said arms, and a receiver arranged beneath and rearwardly of said reel and having a perforated top.

3. An attachment for mowers comprising a reel inclusive of an axle and a series of arms mounted loosely on the axle, driving members mounted on said axle, said arms being formed with shoulders adapted to be engaged by said driving members to establish a driving connection between said arms and said axle, a spring urging said shoulders into engagement with said driving member, brushing members carried by said arms, a receiver arranged beneath and rearwardly of said reel and having a perforated top, and means establishing a sliding and universal connection between the axle and a rotatable portion of the mower.

4. An attachment for mowers comprising a finger bar, a reel inclusive of an axle having a plurality of pins extending therethrough and a plurality of arms mounted on the axle and having semi-circular recesses terminating in shoulders engaged by said pins, and springs confined between said arms and urging said shoulders into engagement with said pins to establish a driving connection between the arms and the axle, said arms being provided with brushing members.

5. An attachment for mowers comprising a finger bar, a reel inclusive of an axle having a plurality of driving pins extending therethrough and a plurality of arms mounted on the hub and having semi-circular recesses terminating in shoulders engaged by said driving pins, springs confined between said arms and urging said shoulders into engagement with said pins to establish a driving connection between the arms and the axle, said arms being provided with brushing members, and means to secure the reel to the finger bar of a mower.

6. An attachment for mowers comprising a finger bar, a reel inclusive of an axle having a plurality of pins extending therethrough and a plurality of arms mounted on the axle and having semi-circular recesses terminating in shoulders engaged by said pins, springs confined between said arms and urging said shoulders into engagement with said pins to establish a driving connection between the arms and the axle, said arms being provided with brushing members, means to secure the reel to the finger bar of a mower, and a pan arranged rearwardly of the finger bar, said pan being provided with a hinged cover.

7. An attachment for mowers comprising a finger bar, a reel inclusive of an axle having a plurality of pins extending therethrough and a plurality of arms mounted on the axle and having semi-circular recesses terminating in shoulders engaged by said pins, springs confined between said arms and urging said shoulders into engagement with said pins to establish a driving connection between the arms and the axle, said arms being provided with brushing members, means to secure the axle to the finger bar of a mower, and a pan arranged rearwardly of the finger bar, said pan being provided with a hinged cover, said brushing members being movable out of engagement with the cover of said pan to permit the cover to be elevated.

8. An attachment for mowers comprising an axle, a plurality of arms loosely mounted on the shaft and having semi-circular recesses terminating in shoulders, pins extending through said axle and engaged by said shoulders, springs mounted on said axle and urging said shoulders into engagement with said pins, brushing members carried by said arms, and a receiver arranged beneath said brushing members, said brushing members being movable out of engagement with the receiver.

9. An attachment for mowers comprising an axle, a plurality of arms loosely mounted on the shaft and having semi-circular recesses terminating in shoulders, pins extending through said axle and engaged by said shoulders, springs mounted on said axle and urging said shoulders into engagement with said pins, brushing members carried by said arms, a receiver arranged beneath said brushing members, said brushing members being movable out of engagement with the receiver to permit the receiver to be opened, and means to connect the shaft to one of the wheels of the mower.

10. An attachment for mowers comprising an axle, a plurality of arms loosely mounted on the axle and having recesses terminating in shoulders, pins extending through said axle and engaged by said shoulders, springs mounted on said axle and urging said shoulders into engagement with said pins, brushing members carried by the ends of said arms, a receiver arranged beneath said brushing members, said brushing members being movable out of engagement with the receiver to permit the receiver to be opened, means to connect the shaft to one of the wheels of the mower, and a divide arranged at one end of said receiver.

11. The combination with a mower having a wheel and a tongue, of a sprocket wheel secured to said wheel, a second sprocket wheel arranged in advance of said first named sprocket wheel, a sprocket chain establishing a driving connection between the first and second named sprocket wheels, a bracket of U-shaped formation having parallel branches between which the second named sprocket wheel is located, a shaft having connection with said second named sprocket wheel and rotatably supported by branches, a reel having connection with said shaft and having brushing means, said mower being provided with a finger bar located beneath said brushing means, and upper and lower bolts connecting said U-shaped bracket to said tongue.

ROY CLARENCE BECTON.